United States Patent Office 3,085,082
Patented Apr. 9, 1963

3,085,082
COMPATIBLE BLENDS OF RIGID VINYL CHLORIDE POLYMERS AND ALPHA OLEFIN POLYMERS CONTAINING COMPATIBILIZING AMOUNTS OF A HALOGENATED POLYOLEFIN
Massimo Baer, Longmeadow, and Ernest H. Hankey, Springfield, Mass., assignors to Monsanto Chemical Company, St. Louis, Mo., a corporation of Delaware
No Drawing. Filed Mar. 23, 1959, Ser. No. 800,911
10 Claims. (Cl. 260—45.5)

The present invention relates to blends of thermoplastic polymers and more particularly to blends of a rigid vinyl chloride polymer and a hydrocarbon elastomer.

It is known that blends of rigid vinyl chloride polymers and certain diene elastomers which contain polar groups in their chemical structure have desirable physical properties. In particular, polymer blends containing 80–95% of the vinyl chloride polymer and, correspondingly, 20–5% of the diene elastomer are easily processed and have considerably higher impact strength than the rigid vinyl chloride polymer included therein. Such polymer blends are useful in the fabrication of rigid shock resistant items such as pipe, tubing, sheets, and the like. Polymer blends containing larger quantites of the elastomer, e.g., 10–80% of the vinyl chloride polymer and, correspondingly, 90–20 parts of the diene elastomer, are tough flexible materials which resemble rubber and/or plasticized vinyl chloride polymers in properties, but have certain definitely superior properties as compared with either rubber or conventionally plasticized vinyl chloride polymers. The diene elastomers included in the above described polymer blends contain in their chemical structure polar groups such as chloride atoms, ester groups, nitrile groups and the like. Typical of the diene elastomers employed are polychloroprene, butadiene-acrylonitrile copolymers, butadiene-methyl isopropenyl ketone copolymers, butadiene-vinyl pyridine copolymers, butadiene-ethyl acrylate copolymers etc.

Although blends of rigid vinyl chloride polymers and nonpolar hydrocarbon elastomers such as natural rubber, polybutadiene, styrene-butadiene rubbers, polyethylene and the like are known, these polymer blends do not have physical properties which correspond to those of the polymer blends described in the paragraph above. In particular, such blends of vinyl chloride polymers and the nonpolar hydrocarbon elastomers tend to be weak and cheesy. Obviously it would be desirable to have available to the art means for preparing polymer blends of good properties from rigid vinyl chloride polymers and nonpolar hydrocarbon elastomers.

It is an object of this invention to provide novel polymer compositions having good properties and which include therein a rigid vinyl chloride polymer and a nonpolar hydrocarbon elastomer.

Other objects and advantages of this invention will be apparent from the following detailed description thereof.

The above and related objects are attained by preparing compositions consisting essentially of an intimate fusion blend of (1) a rigid vinyl chloride polymer, (2) a nonpolar hydrocarbon elastomer, and (3) a minor but effective quantity of a third component which renders the rigid vinyl chloride polymer and the nonpolar hydrocarbon elastomer more compatible and improves the physical properties, especially the impact strength, of the polymer blend. In the subsequent description of this invention the third component of the polymer blend will be referred to as a "compatibilizing agent." This compatibilizing agent may be of a wide variety of chemical types, but preferably is (1) a polymer containing in its chemical structure one or more polar groups or (2) a surfactant or a mixture of two or more surfactants. Such polymer blends are prepared by subjecting the rigid vinyl chloride polymer, the nonpolar hydrocarbon elastomer and the compatibilizing agent to an intensive mixing action at an elevated temperature.

The following examples are set forth to illustrate more clearly the principle and practice of this invention to those skilled in the art. Where parts or quantities are mentioned, they are parts or quantities by weight.

Unless otherwise noted, all of the polymer blends subsequently reported in the examples are prepared by the following standard procedure. The vinyl chloride polymer and a stabilizer therefore are worked on a 2-roll rubber mill until a rolling bank is formed. Thereafter, the compatibilizing agent, the nonpolar hydrocarbon elastomer and any additional components such as lubricants, fillers, etc., are added on the mill and the resulting mixture is worked for the period of time indicated in the examples. The roll temperatures are maintained at 340° F. throughout the mixing operation. The polymer blends are heated for 4 minutes at 185° C. and then compression molded for 1 minute at 185° C. under a pressure of 4,000 p.s.i. to prepare test specimens for measurement of physical properties.

EXAMPLE I

Part A

A blend of 95 parts of a vinyl chloride homopolymer, 5 parts of polyethylene, 2 parts of a tin stabilizer and 4 parts of calcium stearate is milled for 25 minutes and the resulting blend has an Izod impact strength of 2.4 ft. lbs./inch of notch. This and all subsequently reported impact values are measured at 25° C. using a notch having a radius of curvature of 0.010".

A blend of 95 parts of the same vinyl chloride homopolymer, 5 parts of the same polyethylene and 2 parts of the same tin stabilizer is milled for 25 minutes to prepare a control blend. This control blend has an Izod impact strength of only 1.5 ft. lbs./inch of notch.

The vinyl chloride resin included in the above blends is a commercially available vinyl chloride homopolymer which has a specific viscosity of about 0.48 as measured in an 0.4% solution in cyclohexanone at 25° C. The polyethylene included in the blends has a number average molecular weight of about 25,000–30,000 and a density of about 0.916–0.917.

Part B

Part A above is repeated except that the calcium stearate is replaced with an equivalent quantity of N,N'-distearyl ethylene diamine. The Izod impact strength of the blend is 2.2 ft. lbs./inch of notch.

EXAMPLE II

A polymer blend is prepared by working the following composition for 15 minutes on a rubber mill.

| Ingredient: | Parts |
| --- | --- |
| Vinyl chloride resin | 95 |
| Polyethylene | 5 |
| Titanium dioxide | 3 |
| Calcium stearate | 1 |
| N,N'-distearyl ethylene diamine | 2 |
| Dibutyl tin dilauryl mercaptide | 2 |

The vinyl chloride resin and the polyethylene employed in the above blend are described in Example I. The compatibilizing agent is the mixture of calcium stearate and the N,N'-distearyl ethylene diamine. The dibutyl tin dilauryl mercaptide functions as a stabilizer for the vinyl chloride resin and the titanium dioxide is included solely for its tinctorial properties. The Izod impact strength of the blend is 2.5 ft. lbs./inch of notch.

EXAMPLE III

Part A

Thirteen polymer blends are prepared having the composition and physical properties set forth in Table I.

TABLE I

| Blend Identification | A | B | C | D | E | F | G | H | I | J | K | L | M |
|---|---|---|---|---|---|---|---|---|---|---|---|---|---|
| Component: | | | | | | | | | | | | | |
| Vinyl Chloride Resin | 95 | 95 | 93 | 95 | 97 | 95 | 90 | 92 | 90 | 95 | 95 | 95 | 95 |
| Polyethylene | 5 | 5 | 7 | 5 | 3 | | | | | 5 | | 5 | 5 |
| Styrene-Butadiene Elastomer | | | | | | 5 | 10 | 8 | 5 | | | | |
| Polybutadiene Elastomer | | | | | | | | | | | 5 | | |
| Sorbitan Monolaurate | 2 | | | | | 2 | 2 | 2 | 2 | | 2 | 2 | 2 |
| Sodium Lauryl Sulfate | 1 | | | | | 1 | 1 | 1 | 1 | | 1 | | 1 |
| Chlorinated Polyethylene | | 5 | 3 | 2 | 7 | | | | | 5 | | | |
| Dibutyl Tin Dilauryl Mercaptide | 2 | 2 | 2 | 2 | 2 | 2 | 2 | 2 | 2 | 2 | 2 | 2 | 2 |
| Calcium Stearate | 1 | 1 | 1 | 1 | 1 | 1 | 1 | 1 | 1 | 1 | 1 | 1 | 1 |
| N,N'-Distearyl Ethylene Diamine | 2 | 2 | 2 | 2 | 2 | 2 | 2 | 2 | 2 | 2 | 2 | | 2 |
| Physical Properties [1]: | | | | | | | | | | | | | |
| Impact Strength @ 25° C., ft. lbs./inch of notch [2] | 18.0 | 19.0 | 16.0 | 19.1 | 21.6 | 22.3 | 16.0 | 19.9 | 13.5 | 21.2 | 20.9 | 20.1 | 18.9 |
| Tensile Strength @ yield, p.s.i. | 5,000 | 5,400 | 5,200 | 5,700 | 5,800 | 5,850 | 4,350 | 4,800 | 4,350 | 5,450 | 5,450 | | |
| Percent Elongation @ yield | 2.9 | 3.0 | 2.8 | 2.8 | 3.0 | 2.2 | 2.0 | 2.0 | 2.2 | 3.0 | 2.1 | | |
| Modulus @ yield × $10^5$, p.s.i. | 2.8 | 3.0 | 2.8 | 3.1 | 3.0 | 3.7 | 2.9 | 3.1 | 2.7 | 3.0 | 3.3 | | |

[1] All properties measured by current ASTM methods.
[2] Measured with a notch having a radius of curvature of 0.010″.

The vinyl chloride resin and the polyethylene elastomer included in the blends are the same polymers described in Example I. The styrene-butadiene elastomer is GR–S 1006 which is an interpolymer of 95% butadiene and 5% styrene. The polybutadiene elastomer has a molecular weight in excess of 1,000,000. The chlorinated polyethylene included in the blends as a compatibilizing agent contains about 45% chloride and, before chlorination, the polyethylene polymer has a molecular weight of about 20,000. Each of the blends is worked on the rubber mill for about 15 minutes.

Part B

A series of 6 polymer blends identical with blends A, F, G, H, I and K of Table I are prepared except that the sorbitan monolaurate is replaced with an equivalent quantity of glyceryl monostearate. Comparable results are obtained.

EXAMPLE IV

Part A

Four polymer blends are prepared having the composition and physical properties set forth in Table II.

TABLE II

| Blend Identification | N | O | P | Q |
|---|---|---|---|---|
| Component: | | | | |
| Vinyl Chloride Resin | 95 | 95 | 95 | 95 |
| Polyethylene | 5 | | | |
| Polypropylene | | 5 | | |
| Butyl Rubber | | | 5 | |
| Chlorinated Polyethylene | | | 5 | 5 |
| Styrene-Methyl Methacrylate-Polybutadiene Graft Copolymer | 5 | 5 | | |
| Dibutyl Tin Dilauryl Mercaptide | 2 | 2 | 2 | 2 |
| Stearic Acid | 1 | 1 | 1 | 1 |
| Physical Properties [1]: | | | | |
| Impact Strength @ 25° C., ft. lbs./inch of notch [2] | 22.0 | 22.0 | 19.0 | 21.0 |
| Tensile Strength @ yield, p.s.i. | 5,850 | 5,850 | 6,060 | 6,200 |
| Percent Elongation @ yield | 3.0 | 3.2 | 3.4 | 3.2 |
| Modulus @ yield × $10^5$, p.s.i. | 3.2 | 2.9 | 2.8 | 2.9 |

[1] All properties measured by current ASTM methods.
[2] Measured with a notch having a radius of curvature of 0.010″.

The vinyl chloride resin, the polyethylene elastomer and the chlorinated polyethylene included in the blends are the same polymers described in Example III, Part A. The polypropylene elastomer is an atactic (amorphous) polymer having a molecular weight of about 40,000. The butyl rubber elastomer is a commercially available copolymer of about 98% isobutylene and about 2% isoprene. The styrene-methyl methacrylate-polybutadiene graft copolymer is prepared by polymerizing 28 parts of styrene and 12 parts of methyl methacrylate in a latex containing 100 parts of polybutadiene. Each of the blends is worked on the rubber mill for about 15 minutes.

Part B

Two additional polymer blends identical with blend N of Table II are prepared except that the styrene-methyl methacrylate-polybutadiene graft copolymer is replaced with a different polymeric compatibilizing agent. In one of the polymer blends, the compatibilizing agent is a graft copolymer prepared by polymerizing 28 parts of styrene and 12 parts of acrylonitrile in a latex containing 100 parts of polybutadiene. In the second blend the compatibilizing agent is a copolymer of 56% ethylene and 44% vinyl acetate which has a molecular weight of about 10,000. Comparable physical properties are obtained with these polymer blends.

EXAMPLE V

Test specimens formed from polymer blends A—G identified in Table I are tested for chemical resistance by soaking them in, respectively, concentrated sulfuric acid, concentrated nitric acid, glacial acetic acid and kerosene for six days at 140° F. and subsequently determining the gain in weight of the specimen. The results shown as the percent gain in weight are set forth in Table III.

TABLE III

| Polymer Blend | A | B | C | D | E | F | G |
|---|---|---|---|---|---|---|---|
| Liquid: | | | | | | | |
| Conc. Sulfuric Acid | 0.35 | 0.25 | | 0.20 | 0.20 | 15.4 | 30.9 |
| Conc. Nitric Acid | 5.1 | 3.6 | 4.0 | 3.6 | 3.1 | 6.0 | 9.4 |
| Glacial Acetic Acid | 1.6 | 1.6 | 1.4 | 1.2 | 1.1 | 2.9 | 9.4 |
| Kerosene | 0.05 | 0.20 | 0.07 | 0.06 | 0.05 | 0.03 | 0.76 |

As earlier noted, the compositions of this invention comprises an intimate fusion blend of (a) a rigid vinyl chloride polymer, (b) a nonpolar hydrocarbon elastomer that is normally incompatible with said rigid vinyl chloride polymer, and (c) a compatabilizing agent that enhances the compatibility of the rigid vinyl chloride polymer and the nonpolar hydrocarbon elastomer.

The proportions of the rigid vinyl chloride polymer and the nonpolar hydrocarbon elastomer to be included in the polymer blends will depend primarily upon the properties desired in the blend. Where hard rigid materials suitable for use in the manufacture of pipe and similar items are desired, the polymer blends will contain about 70–95 parts of the rigid vinyl chloride polymer and, correspondingly, about 30–5 parts of the nonpolar hydrocarbon elastomer. Rigid polymer blends of optimum properties will contain 80–95 parts of the rigid vinyl chloride polymer and, correspondingly, 20–5 parts of the nonpolar hydrocarbon elastomer or more especially 85–95 parts of the rigid vinyl chloride polymer and, correspondingly, 15–5 parts of the nonpolar hydrocarbon elastomer. It will be understood, of course, that the particular proportions of the two polymers to be included in such rigid polymer blends will be somewhat dependent upon the nature and characteristics of the individual polymers employed therein. Where elastic, rubbery and/or leather-like materials are desired, the polymer blends may contain about 10–79 parts of the rigid vinyl chloride polymer and, correspondingly, about 90–21 parts of the nonpolar hydrocarbon elastomer.

The quantity of the compatibilizing agent included in the polymer blend will be sufficient to enhance the compatibility of the rigid vinyl chloride polymer and the nonpolar hydrocarbon elastomer. The minimum quantity required for this purpose will depend somewhat upon the particular compatibilizing agent employed, but can be established through routine experimentation. Specifically, to determine the minimum quantity of the compatibilizing agent required, the blend of the rigid vinyl chloride polymer, the nonpolar hydrocarbon elastomer and the compatibilizing agent should be worked for 15 minutes on a 2-roll rubber mill with the roll temperatures being maintained at 340° F. The resulting blend then should be compared with a similarly worked control blend that contains no compatibilizing agent. In the case of blends containing at least 70 parts of the rigid vinyl chloride resin and less than 30 parts of the nonpolar hydrocarbon elastomer, the blend containing the compatibilizing agent will have a higher Izod impact strength. The quantity of the compatibilizing agent employed should be such that the impact strength of the blend containing the compatibilizing agent is at least 0.5 ft. lb./inch of notch higher than the impact strength of the control blend. In the case of blends containing less than 70 parts of the rigid vinyl chloride polymer and more than 30 parts of the nonpolar hydrocarbon elastomer, the blend containing the compatibilizing agent will have a higher elongation at yield. In most cases the compatibilizing agent will constitute 1–10 or preferably 2–8% by weight of the blend.

The vinyl chloride polymer included in the polymer blends may be any rigid vinyl chloride polymer such as vinyl chloride homopolymers and interpolymers of vinyl chloride with interpolymerizable monomers such as vinyl esters of organic acids containing 1–18 carbon atoms, e.g., vinyl acetate, vinyl stearate, etc.; vinylidene chloride; acrylonitrile; methacrylonitrile; alkyl acrylate esters in which the alkyl group contains 1–8 carbon atoms, e.g., methyl acrylate and butyl acrylate; the corresponding alkyl methacrylate esters; dialkyl esters of dibasic organic acids in which the alkyl groups contain 1–8 carbon atoms, e.g., dibutyl fumarate, diethyl maleate, etc. In general, where vinyl chloride interpolymers are employed, they should contain at least about 80 weight percent of vinyl chloride. To obtain optimum properties in the polymer blends, the vinyl chloride polymer included therein should have a relatively high molecular weight, e.g., the polymers should have a specific viscosity of at least about 0.4 as determined in an 0.4 weight percent solution in cyclohexanone at 25° C.

The nonpolar hydrocarbon elastomer included in the polymer blend may be essentially any thermoplastic hydrocarbon polymer that has an elogation at break of at least 5% and that is essentially free of polar substituents such as halogen atoms, ester groups, amide groups, amine groups, nitrile groups, hydroxyl groups, carboxyl groups and the like. One class of such nonpolar hydrocarbon elastomers consists of homopolymers of alpha-olefines such as ethylene, propylene, isobutylene and the like, interpolymers consisting solely of two or more such alpha-olefines and interpolymers of at least 85% by weight of such an alpha-olefine with up to 15% by weight of an interpolymerizable vinylidene monomer such as vinyl chloride, vinylidene chloride, vinyl acetate, alkyl acrylate esters such as methyl acrylate and butyl acrylate, the corresponding aklyl methacrylate esters, styrene, alpha-methylstyrene, ring-alkyl substituted styrenes, butadiene, isoprene and the like. Another class of suitable nonpolar hydrocarbon elastomers consists of homopolymers of alicyclic conjugated 1,3-dienes such as butadiene, isoprene, 2,3-dimethylbutadiene, piperylene and the like and interpolymers of such conjugated dienes which contain at least 50% by weight of the conjugated diene. The comonomers included in such conjugated diene interpolymers preferably are hydrocarbon monomers such as styrene, alpha-methylstyrene, ring-alkyl substituted styrenes and the like. In some cases, if desired, the rubbery diene interpolymer may contain up to about 10% by weight of a vinylidene monomer containing a polar substituent such as a halogen atom, an ester group, an amide group, an amine group, a nitrile group, a hydroxyl group, a carboxyl group or the like. Typical examples of such polar monomers include acrylonitrile, methacrylonitrile, alkyl acrylate esters such as methyl acrylate and butyl acrylate, the corresponding alkyl methacrylate esters, vinyl acetate, acrylic acid, methacrylic acid, acrylamide, methacrylamide, vinylidene chloride, vinyl pyridine, ring-alkyl substituted pyridines and the like.

The compatibilizing agent included in the polymer blends may be either (1) a surfactant or (2) a polymer containing polar groups in its chemical structure and especially an elastomer containing polar groups.

The surfactants that are usable as a compatibilizing agent may be of the cationic, anionic or nonionic type. As is known, such surfactants contain both a hydrophobic group, i.e., a hydrocarbon chain containing about 8 or more carbon atoms, and a hydrophilic group which may be a carboxyl group, a sulfoxy group, an amine group, a hydroxyl group, an amide group, a polyoxyethylene chain or the like.

Suitable anionic surfactants include metal and amine salts of 8–30 carbon atom fatty acids such as calcium stearate, barium stearate, sodium laurate, ammonium oleate, the triethanolamine salt of coconut oil fatty acids, etc.; metal and amine salts of rosin acids; metal and amine salts of alkylsulfonic acids in which the alkyl group preferably contains 8–30 atoms; metal and amine salts of sulfate esters of 8–30 carbon atom fatty alcohols; metal and amine salts of long chain alkylaryl sulfonates such as sodium dodecylbenzene sulfonate; and metal and amine salts of long chain alkyl sulfosuccinate esters such as N-octadecyl disodium sulfosuccinate.

Suitable nonionic surfactants include esters formed by partially esterifying polyhydric alcohols with 8–30 carbon atom fatty acids, e.g., ethylene glycol monolaurate, glyceryl monolaurate, pentaerythritol monolaurate, sorbitan monopalmitate, sorbitan monostearate, sorbitan distearate, etc.; ethylene oxide condensates of the partial esters of polyhydric esters above described; and ethylene oxide condensates of reactive hydrogen compounds containing 8 or more carbon atoms in their structure, i.e., the long chain fatty alcohols such as lauryl alcohol and stearyl alcohol, the long chain fatty acids such as myristic acid and stearic acid, the rosin acids, long chain alkyl mercaptans such as dodecyl mercaptan, and alkylphenols such as nonylphenol. Another suitable class of nonionic surfactants consists of the conjugated polyoxypropylene-polyoxyethylene compounds disclosed in U.S. 2,674,619 and U.S. 2,677,700.

Cationic surfactants usable in the present invention include quaternary ammonium salts containing a long chain alkyl group such as cetyl pyridinium chloride and lauryl trimethyl ammonium bromide; amines such as lauryl amine, stearyl amine, rosin amine and N-dodecyl ethylene diamine; and amides such as oleoamide, stearyl amide and N-octadecyl acetamide.

For a list of additional surfactants that can be employed as a compatibilizing agent see the comprehensive list of commercially available surfactants set forth by J. W. McCutcheon in the 1955 July, August, September and October issues of Soap and Chemical Specialties. In some cases it is desirable to use a mixture of two or more surfactants as the compatibilizing agent. Particularly good results are obtained by using a mixture of an anionic surfactant such as a sodium salt of a sulfate ester of a long chain fatty alcohol, e.g., sodium lauryl sulfate, and a nonionic surfactant such as glyceryl monostearate or sorbitan monostearate.

The second class of compatibilizing agents that may be employed in the invention consists of polymers which contain in their chemical structure polar groups such as halogen atoms, ester groups, carbonyl groups, amide groups, amine groups, nitrile groups, carboxyl groups etc.

A preferred type of polymeric compatibilizing agent is a chlorinated ethylene polymer containing about 20–55% by weight of chlorine and which has, before chlorination, a molecular weight of at least 6,000 and preferably 20,000 or more. The ethylene polymer that is chlorinated may be either polyethylene or an interpolymer of at least 85% by weight of ethylene with up to 15% by weight of an interpolymerizable vinylidene monomer such as vinyl chloride, vinylidene chloride, vinyl acetate, alkyl acrylate esters such as methyl acrylate and butyl acrylate, the corresponding alkyl methacrylate esters, styrene, alpha-methylstyrene, ring substituted alkylstyrenes, butadiene, isoprene and the like.

Another class of suitable polymeric compatibilizing agents consists of graft copolymers prepared by polymerizing 10–200 and preferably 20–80 parts by weight of specified monomer mixtures in an aqueous dispersion containing 100 parts by weight of a rubbery diene polymer. The monomer mixtures employed in the preparation of the graft copolymers consists of (a) 10–100% by weight of an alkyl ester of either acrylic acid or methacrylic acid in which the alkyl group contains 1–4 carbon atoms and, correspondingly, 90–0% by weight of a monovinylidene aromatic hydrocarbon or (b) 10–90% by weight of either acrylonitrile or methacrylonitrile and, correspondingly 90–10% by weight of a monovinylidene aromatic hydrocarbon. Typical of the monovinylidene aromatic hydrocarbon monomers that may be employed in the above monomer mixtures are styrene; ring-substituted alkylstyrenes, e.g., 2,4-dimethylstyrene, p-ethylstyrene, etc., ring-substituted halostyrenes, e.g., o-, m-, and p-chlorostyrenes, 2,4-dichlorostyrene, etc.; ring-substituted alkyl-, ring-substituted halostyrenes, e.g., 2-methyl-4-chlorostyrene, etc.; or mixtures of such monovinylidene aromatic hydrocarbons, which mixtures may include a monovinylidene aromatic hydrocarbon compound which, by itself, will not readily interpolymerize with acrylonitrile or alkyl acrylate esters, e.g., alpha-methylstyrene.

The rubbery diene polymers on which the above described monomer mixtures are polymerized may be essentially any polymer of an acyclic conjugated 1,3-diene having a second order transition temperature below 0° C. and preferably below −20° C. The preferred diene polymers for this purpose are homopolymers of butadiene, isoprene, 2,3-dimethylbutadiene, piperylene, and the like or interpolymers of at least 50% by weight of such a diene with an interpolymerizable vinylidene monomer such as styrene, acrylonitrile, alkyl acrylates such as methyl acrylate and butyl acrylate and the like. It is frequently desirable to include a small quantity e.g., 0.5–3.0% by weight, of a polyunsaturated monomer such as divinyl benzene or diallyl maleate in the rubbery diene polymer.

Methods for preparing graft copolymers of the above types are well known. See for example U.S. 2,802,809 and the copending application of Massimo Baer, S.N. 706,543, filed January 2, 1958.

Still another class of polymeric compatibilizing agents that can be included in the polymer blends of the invention consists of interpolymers of 40–85% by weight of acyclic conjugated 1,3-dienes such as butadiene, isoprene, 2,3-dimethylbutadiene, piperylene and the like and, correspondingly, 60–15% by weight of a comonomer such as acrylonitrile, methacrylonitrile, alkyl esters of either acrylic acid or methacrylic acid in which the alkyl group contains 1–8 carbon atoms, a vinyl aliphatic ketone such as methyl isopropenyl ketone, vinyl pyridine, ring-substituted alkyl vinyl pyridines in which the alkyl groups contain 1–4 carbon atoms, e.g., vinyl 2-ethyl pyridine, dialkyl fumarates in which the alkyl groups contain 1–8 carbon atoms, ring-substituted acetyl styrenes and mixtures thereof. Other polymeric compatibilizing agents that may be employed include (1) polychloroprene, (2) sulfone resins of the type described in U.S. 2,645,631, e.g., copolymers of sulful dioxide and alpha-olefines containing 3–12 carbon atoms, (3) interpolymers of 40–80% by weight of a monovinylidene aromatic hydrocarbon monomer from the group set forth in the third paragraph above and, correspondingly, 60–20% by weight of a monomer of the group consisting of acrylonitrile, methacrylonitrile and alkyl esters of acrylic or methacrylic acid in which the alkyl group contains 1–4 carbon atoms, and (4) interpolymers of 30–70% by weight of either ethylene or propylene and, correspondingly, 70–30% by weight of a vinyl ester of an alkanoic acid containing 1–4 carbon atoms, e.g., vinyl acetate.

In addition to the rigid vinyl chloride polymer, the nonpolar hydrocarbon elastomer and the compatibilizing agent, the polymer blends of this invention ordinarily will contain conventional stabilizers and antioxidants of the type employed with vinyl chloride polymers. If desired, colorants, lubricants, pigments, fillers, etc., also may be included in the polymer blends.

The rigid vinyl chloride polymer, the nonpolar hydrocarbon elastomer and the compatibilizing agent may be blended together by being worked on conventional plastics working equipment such as rubber mills, Banbury mixers, extruders, etc. The blends should be worked at a temperature above that at which the vinyl chloride polymer fuses to obtain an intimate well fused blend. Temperatures within the range of about 300–370° F. are normally employed. If desired, it is also possible to prepare an aqueous dispersion of the three components, e.g., by mixing latexes of the vinyl chloride polymer and the nonpolar hydrocarbon elastomer and incorporating the compatibilizing agent in the mixed latexes, and then coagulating and/or drying the dispersion to recover a blend of the three components. This procedure is particularly convenient to use when the compatibilizing agent that is to be included in the blend is at least one surfactant. In these situations the surfactant can be employed as the emulsifying agent in the preparation of one or both of the polymers, i.e., the vinyl chloride polymer and the nonpolar hydrocarbon elastomer. After the mixed polymers are recovered by this procedure it is still necessary to heat the mixture for a short time while comalaxating the composition on some type of plastics working equipment.

The preferred polymer blends of the invention are those in which the nonpolar hydrocarbon elastomer is a polymer of an alpha-olefine such as ethylene and particularly polyethylene. These polymer blends, in addition to having excellent physical properties, have outstanding resistance to oxidation and/or ultra-violet light. For this reason, such polymer blends are well adapted to be employed in the manufacture of articles which will be exposed to air and/or sunlight for extended periods of time.

EXAMPLE VI

A specimen of polymer blend "A" identified in Table I and a control polymer blend are placed within 1½" of a 40 watt fluorescent sunlamp which radiates strongly in the ultraviolet region of the spectrum (Westinghouse FS 40–T–12). The control polymer blend is identical in composition with polymer blend "A" except that a rubbery copolymer of about 79% butadiene and about 21% acrylonitrile is substituted for the polyethylene. The two polymer blends are examined visually at the end of 7, 14, 21 and 28 day periods. Polymer blend "A" is not discolored after 7, 14, 21 days and shows only a slight yellowing at the end of the 28 day exposure. By way of contrast, the control polymer blend develops a very noticeable yellowing within 7 days. This discoloration becomes progressively darker with increased exposure and at the end of the 28 day period the control polymer blend is dark brown in color.

The polymer blends of the invention can be molded, calendered or extruded into diverse shapes and forms such as rods, tubes, sheets, films, filaments, etc., by techniques well known in the polymer art. The rigid polymer blends, i.e., those containing at least 70% by weight of the rigid vinyl chloride polymer, have utility in many fields where vinyl chloride polymers of high impact strength are desired and especially in the manufacture of plastic pipe. The flexible polymer blends, i.e., those blends containing more than 30% by weight of the nonpolar hydrocarbon elastomer, have utility as an electrical cable insulation material, as a film in the manufacture of shower curtains and similar items, etc.

The above descriptions and particularly the examples are set forth by way of illustration only. Many other variations and modifications thereof will be obvious to those skilled in the art and can be made without departing from the spirit and scope the invention herein described.

What is claimed is:

1. A composition of matter consisting essentially of an intimate fusion blend of 95 parts by weight of polyvinyl chloride, 5 parts by weight of polyethylene and 5 parts by weight of a chlorinated polyethylene which contains about 20–55% by weight of chlorine, said polyethylene, before chlorination, having a molecular weight of at least 6,000.

2. A composition of matter consisting essentially of an intimate fusion blend of 95 parts by weight of polyvinyl chloride, 5 parts by weight of an atactic polypropylene and 5 parts by weight of a chlorinated polyethylene which contains about 20–55% by weight of chlorine, said polyethylene, before chlorination, having a molecular weight of at least 6,000.

3. A composition of matter consisting essentially of an intimate fusion blend of 95 parts by weight of polyvinyl chloride, 5 parts by weight of a copolymer of about 98% isobutylene and about 2% isoprene and 5 parts by weight of a chlorinated polyethylene which contains about 20–55% by weight of chlorine, said polyethylene, before chlorination, having a molecular weight of at least 6,000.

4. A composition of matter consisting essentially of an intimate fusion blend of 10–95 parts by weight of a rigid vinyl chloride polymer and, correspondingly, 90–5 parts by weight of a polymer of an alpha-olefin that is normally incompatible with said rigid vinyl chloride polymer; said composition also containing a minor quantity of a halogenated polyolefin that is sufficient to enhance the compatibility of the rigid vinyl chloride polymer and said polymer of an alpha-olefin.

5. A composition as in claim 4 in which the halogenated polyolefin is a chlorinated ethylene polymer containing about 20–55% by weight of chlorine.

6. A composition as in claim 4 in which the polymer of an alpha-olefin is polyethylene.

7. A composition of matter consisting essentially of an intimate fusion blend of 70–95 parts by weight of a rigid vinyl chloride polymer and, correspondingly, about 30–5 parts by weight of a polymer of an alpha-olefin that is normally incompatible with said rigid vinyl chloride polymer; said composition also containing a minor quantity of a halogenated polyolefin that is sufficient to enhance the compatibility of the rigid vinyl chloride polymer of an alpha-olefin.

8. A composition as in claim 7 in which the halogenated polyolefin is a chlorinated ethylene polymer containing about 20–55% by weight of chlorine.

9. A composition as in claim 7 in which the polymer of an alpha-olefin is polyethylene.

10. A method for preparing an intimate fusion blend of a rigid vinyl chloride polymer and a polymer of an alpha-olefin that is normally incompatible with said rigid chloride polymer which comprises comalaxating 10–95 parts by weight of a rigid vinyl chloride polymer and, correspondingly, 90–5 parts by weight of a polymer of an alpha-olefin with a minor quantity of a halogenated polyolefin at a temperature about the fusion temperature of the rigid vinyl chloride polymer.

References Cited in the file of this patent

UNITED STATES PATENTS

| | | |
|---|---|---|
| 2,636,866 | Banes et al. | Apr. 28, 1953 |
| 2,657,186 | Klein et al. | Oct. 27, 1953 |
| 2,658,050 | Signer et al. | Nov. 3, 1953 |
| 2,825,661 | Dosman | Mar. 4, 1958 |
| 2,873,259 | Clark | Feb. 10, 1959 |